US010626860B2

(12) United States Patent
Tomari

(10) Patent No.: US 10,626,860 B2
(45) Date of Patent: Apr. 21, 2020

(54) OIL SEPARATE AND COLLECT DEVICE

(71) Applicant: Kobe Steel, Ltd., Hyogo (JP)

(72) Inventor: Keiichiro Tomari, Kobe (JP)

(73) Assignee: Kobe Steel, Ltd., Hyogo (JP)

(*) Notice: Subject to any disclaimer, the term of this patent is extended or adjusted under 35 U.S.C. 154(b) by 189 days.

(21) Appl. No.: 15/741,988

(22) PCT Filed: Jun. 17, 2016

(86) PCT No.: PCT/JP2016/068041
§ 371 (c)(1),
(2) Date: Jan. 4, 2018

(87) PCT Pub. No.: WO2017/010226
PCT Pub. Date: Jan. 19, 2017

(65) Prior Publication Data
US 2018/0202425 A1 Jul. 19, 2018

(30) Foreign Application Priority Data
Jul. 15, 2015 (JP) .................. 2015-141102

(51) Int. Cl.
B01D 17/02 (2006.01)
C02F 1/40 (2006.01)
(Continued)

(52) U.S. Cl.
CPC .......... F04B 39/04 (2013.01); B01D 17/0214 (2013.01); B01D 45/08 (2013.01);
(Continued)

(58) Field of Classification Search
CPC .............................. B01D 17/0214; C02F 1/40
(Continued)

(56) References Cited

U.S. PATENT DOCUMENTS 5,415,776 A * 5/1995 Homan .................. B01D 17/00
210/519
2004/0065110 A1 4/2004 Barratt et al.
2007/0028571 A1 2/2007 Barratt
2008/0011550 A1 1/2008 Dunn et al.
2013/0255308 A1 10/2013 De Larminat

FOREIGN PATENT DOCUMENTS

JP S49-086466 U 7/1974
JP S50-044959 U 5/1975
(Continued)

OTHER PUBLICATIONS

International Preliminary Report on Patentability (PCT/IB/373) dated Jan. 16, 2018 from corresponding PCT/JP2016/068041, 1 pp.
(Continued)

Primary Examiner — Robert A Hopkins
(74) Attorney, Agent, or Firm — Studebaler & Brackett PC

(57) ABSTRACT

An oil separate and collect device (1) has a horizontally elongated container body (2) disposed in a horizontal orientation. A gas inlet (3), through which compressed gas containing oil flows into the container body (2), is located at an upper part on one end side of an interior of the container body (2). A gas outlet (4), through which the compressed gas from which oil has been separated flows out of the container body (2), is located at an upper part on the other end side of the interior of the container body (2). A partition board (5) divides a lower part of the interior of the container body (2) into a first chamber (6) on a gas inlet (3) side and a second chamber (7) on a gas outlet (4) side.

8 Claims, 4 Drawing Sheets

(51) Int. Cl.
| | |
|---|---|
| *F04B 39/04* | (2006.01) |
| *F25B 43/02* | (2006.01) |
| *F25B 31/00* | (2006.01) |
| *F25B 43/00* | (2006.01) |
| *B01D 45/08* | (2006.01) |
| *B01D 46/00* | (2006.01) |

(52) U.S. Cl.
CPC ............ *B01D 46/0031* (2013.01); *C02F 1/40* (2013.01); *F25B 31/004* (2013.01); *F25B 31/008* (2013.01); *F25B 43/003* (2013.01); *F25B 43/02* (2013.01); *F25B 2500/16* (2013.01); *F25B 2500/17* (2013.01)

(58) Field of Classification Search
USPC ......................................................... 210/519
See application file for complete search history.

(56) References Cited

FOREIGN PATENT DOCUMENTS

| | | |
|---|---|---|
| JP | S52-119152 U | 9/1977 |
| JP | S61-019691 U | 2/1986 |
| JP | 2000-234826 A | 8/2000 |

OTHER PUBLICATIONS

Written Opinion dated Sep. 6, 2016, from corresponding PCT/JP2016/068041, with English translation, 12 pp.
Extended European Search Report issued by the European Patent Office dated Jan. 4, 2019, which corresponds to EP16824206.3-1008 and is related to U.S. Appl. No. 15/741,988.
International Search Report issued in PCT/JP2016/068041; dated Sep. 6, 2016.

\* cited by examiner

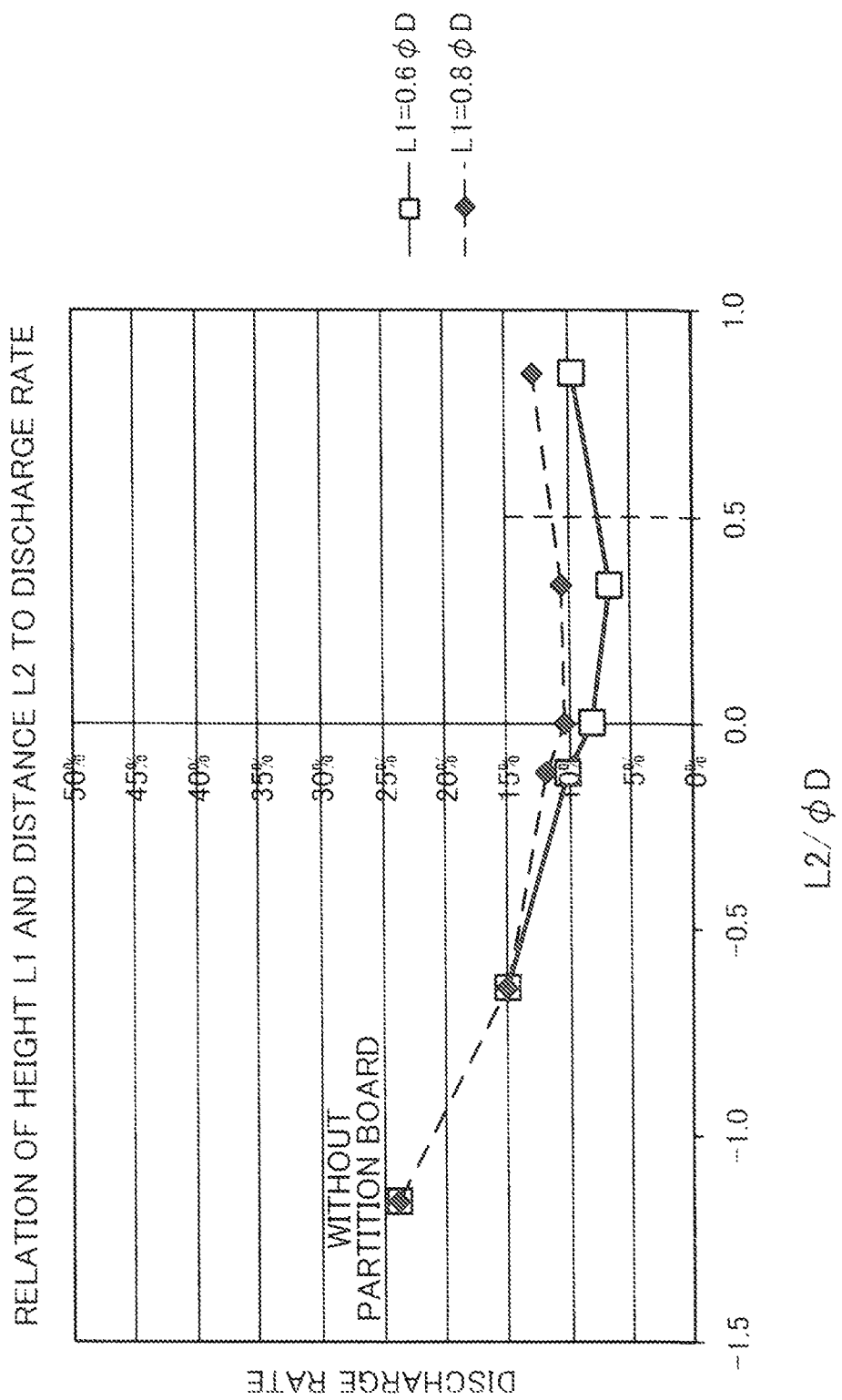

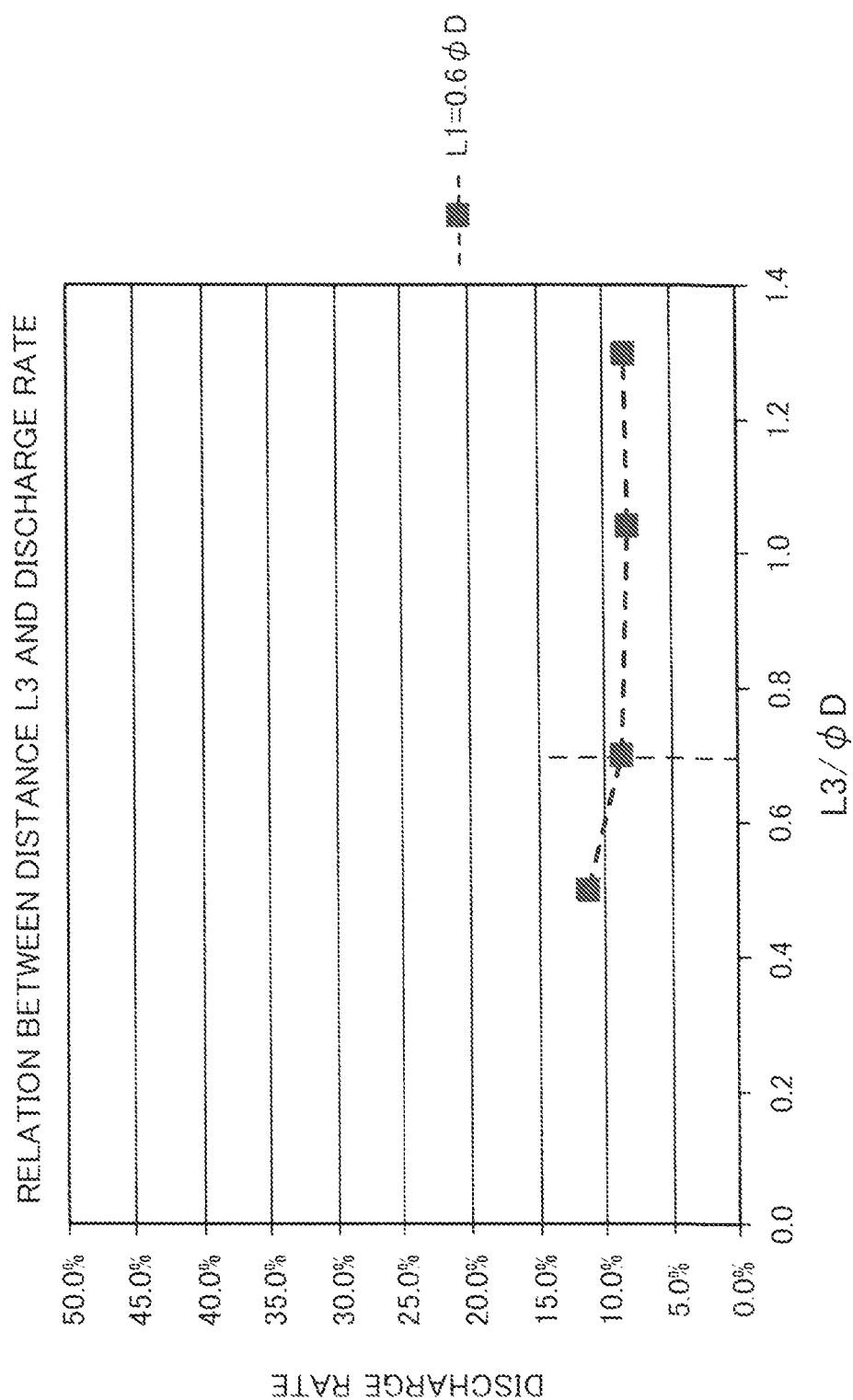

OIL SEPARATE AND COLLECT DEVICE

TECHNICAL FIELD

The present invention relates to an oil separate and collect device configured to separate and collect oil from compressed gas, which contains the oil and has been discharged from an oil-cooled compressor.

BACKGROUND ART

In an oil-cooled compressor, lubricating oil is jetted to a rotor part so that cooling of devices and sealing of compressed gas at the rotor part are performed. Therefore, the compressed gas discharged from the oil-cooled compressor includes the lubricating oil.

An oil separate and collect device disclosed in Patent Literature 1 separates and collects lubricating oil from compressed gas. The oil separate and collect device in Patent Literature 1 has a horizontally elongated container. Therefore, a top face part of the container can function as an installation space for a compressor body or the like. Accordingly, in a case where the oil separate and collect device having the horizontally elongated container is used, an oil-cooled compressor can be made compact in comparison with a case where an oil separate and collect device having a vertically elongated container is used.

However, in the oil separate and collect device having the horizontally elongated container, oil level bubbles when compressed gas, which has flown into the container, is sprayed to the oil level of oil in the container. Therefore, oil droplets or bubbles including oil are generated in compressed gas. Furthermore, since the distance between the outlet of compressed gas and the oil level is small in the horizontally elongated container, the generated oil droplets or oil bubbles are carried on flow of gas around the outlet and flow out of the container. Therefore, the oil separation efficiency of the oil separate and collect device lowers.

Hence, an idea for reducing the oil amount included in compressed gas to the design standard is to install a plurality of oil separating elements on the downstream side of an oil separate and collect device. However, such a case increases the manufacturing cost.

CITATION LIST

Patent Literature

Patent Literature 1: JP 2000-234826 A

SUMMARY OF INVENTION

An object of the present invention is to provide an oil separate and collect device, which can improve the oil separation efficiency without increasing the manufacturing cost.

An oil separate and collect device according to an aspect of the present invention is an oil separate and collect device for separating and collecting oil from compressed gas, which contains the oil and has been discharged from an oil-cooled compressor, the oil separate and collect device including: a horizontally elongated container body disposed in a horizontal orientation; a gas inlet which is located at an upper part on one end side of an interior of the container body and through which the compressed gas containing the oil flows into the container body; a gas outlet which is located at an upper part on the other end side of the interior of the container body and through which the compressed gas from which the oil has been separated flows out of the container body; and a partition board configured to divide a lower part of the interior of the container body into a first chamber on a gas inlet side and a second chamber on a gas outlet side.

BRIEF DESCRIPTION OF DRAWINGS

FIG. 3 is a view illustrating the relation of a height L1 and a distance L2 to a discharge rate.

FIG. 4 is a view illustrating the relation between a distance L3 and a discharge rate.

DESCRIPTION OF EMBODIMENTS

The following description will explain a suitable embodiment of the present invention with reference to the drawings.

(Structure of Periphery of Oil-Cooled Compressor)

Figure 1:
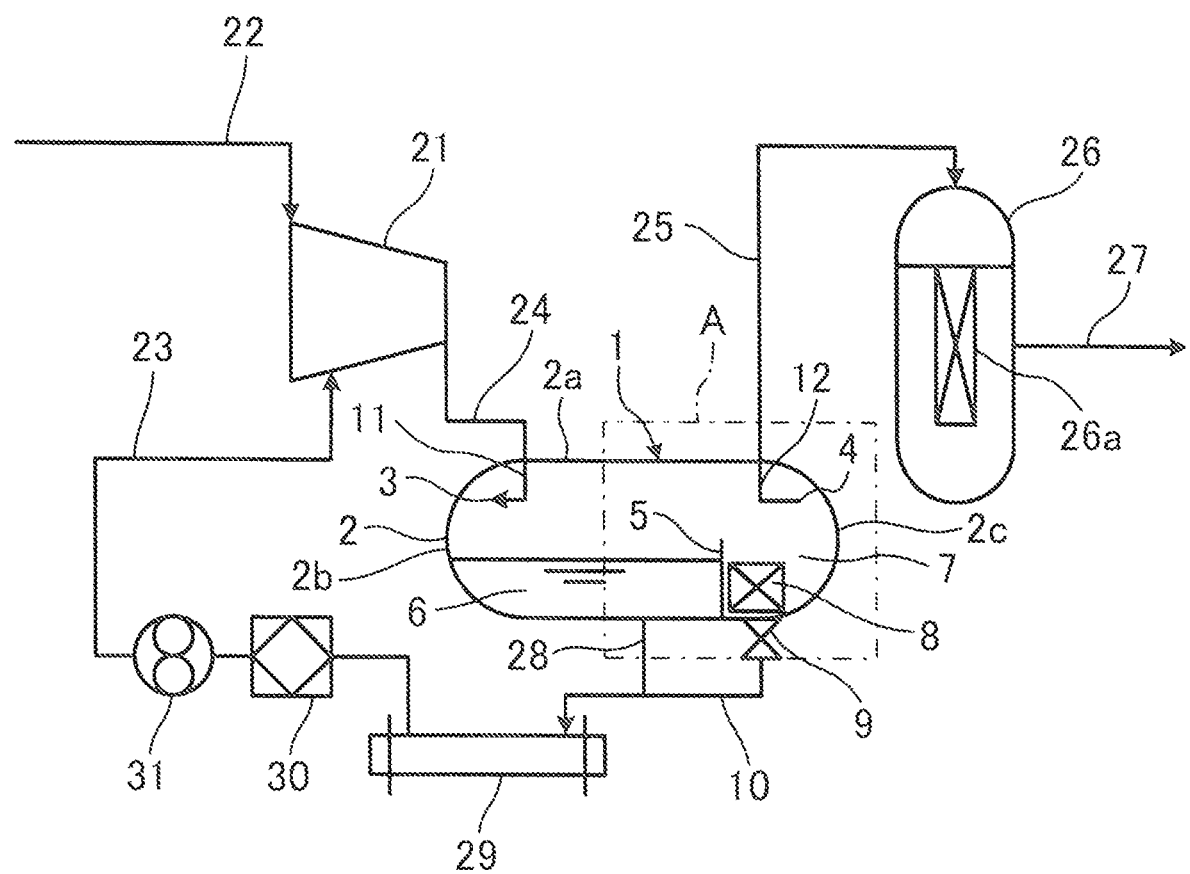
FIG. 1 is a block diagram of the periphery of an oil-cooled compressor.

An oil separate and collect device according to an embodiment of the present invention is used for separating and collecting oil from compressed gas, which contains the oil and has been discharged from an oil-cooled compressor. As illustrated in FIG. 1 which is a block diagram of the periphery of an oil-cooled compressor, an oil separate and collect device 1 is provided on the downstream side of an oil-cooled compressor 21.

A suction opening of the oil-cooled compressor 21 is connected with a suction flow path 22. Gas to be compressed is introduced through the suction flow path 22 into the compressor 21. The oil-cooled compressor 21 compresses gas introduced through the suction flow path 22. As a result, the pressure of the gas rises. Used for the oil-cooled compressor 21 is oil aimed at cooling and lubricating of the device, and sealing of compressed gas at a rotor part. A part on the upstream side of the rotor part in the compressor 21 is connected with an oil supply flow path 23. Oil is injected through the oil supply flow path 23 into the oil-cooled compressor 21. This causes the oil to be accompanied by gas which is to be compressed. Gas, which has been compressed (compressed gas), contains the oil and is discharged through an outlet of the oil-cooled compressor 21. The gas containing the oil flows through a discharge flow path 24 connected with the outlet and is supplied to the oil separate and collect device 1.

In the oil separate and collect device 1, the oil is separated and collected from compressed gas, which has been supplied, using a mass difference. Compressed gas, from which the oil has been separated and collected, is ejected from the oil separate and collect device 1. Compressed gas, which has been ejected from the oil separate and collect device 1, flows through an eject flow path 25 and is supplied to an oil separator 26. The oil separator 26 is provided with an oil separating element (filter) 26a, and catches the oil remaining in the compressed gas. Compressed gas, from which the remaining oil has been separated, flows through a supply flow path 27 and is transferred to a downstream process.

The oil collected in the oil separate and collect device 1 is once retained in the oil separate and collect device 1. The oil retained in the oil separate and collect device 1 is ejected through an oil outlet, which is provided at a lower part, to an oil circulation path 28. This oil flows through the oil circulation path 28 and is transferred to a lubricating oil cooler 29. The lubricating oil cooler 29 cools the oil. The oil cooled at the lubricating oil cooler 29 flows through the oil supply flow path 23 and is filtered by a passing oil filter 30, the pressure of the oil is raised at a lubricating oil pump 31, and then the oil is supplied again to the rotor part of the oil-cooled compressor 21.

(Structure of Oil Separate and Collect Device)

The oil separate and collect device 1 has a horizontally elongated container body 2, which is disposed in a horizontal orientation and is made of metal. The container body 2 is formed of a cylindrical body with both ends being closed. That is, the container body 2 has: a cylindrical drum part 2a; a first end wall 2b, which is connected with one end part of the drum part 2a so as to close one end opening of the drum part 2a; and a second end wall 2c, which is connected with the other end part of the drum part 2a so as to close the other end opening of the drum part 2a. Although the first end wall 2b and the second end wall 2c may be each formed in a flat-plate shape, the first end wall 2b and the second end wall 2c of this embodiment are each formed in a curved shape which expands outward. An upper space above the container body 2 can be utilized as an installation space for the oil-cooled compressor 21 or the like. A gas inlet 3, through which the compressed gas containing the oil flows into the container body 2, is located at an upper part on one end side (first end wall 2b side) of the interior of the container body 2. Moreover, a gas outlet 4, through which the compressed gas from which the oil has been separated flows out of the container body 2, is located at an upper part on the other end side (second end wall 2c side) of the interior of the container body 2. As will be described later, the gas inlet 3 is constituted of an opening on the downstream side of an elbow inflow pipe 11. Moreover, the gas outlet 4 is constituted of an opening on the upstream side of an elbow outflow pipe 12.

Moreover, a partition board 5 configured to divide the internal space of the container body 2 into a first chamber 6, which is a space on a gas inlet 3 side, and a second chamber 7, which is a space on a gas outlet 4 side, is provided at a lower part of the internal space. The partition board 5 is fixed to an inner surface of the drum part 2a over an area from a lower part to a side part of the drum part 2a, and stands upright in the internal space. The oil separated from the compressed gas accumulates mainly in the first chamber 6. Consequently, little oil accumulates in the second chamber 7.

The compressed gas, which has flown into the container body 2, is sprayed to the first chamber 6. This causes the oil level of oil, which has accumulated in the first chamber 6, to bubble, generate oil droplets from the oil level, and generate bubbles including the oil at the oil level. Here, in a case where the partition board 5 is not provided, the distance between the gas outlet 4 and the oil level of the oil, which has accumulated in the container body 2, becomes small in the horizontally elongated container body 2. Therefore, the generated oil droplets and oil bubbles are carried on flow of the compressed gas around the gas outlet 4 and flow out of the container body 2 through the gas outlet 4. Therefore, the oil separation efficiency of the oil separate and collect device 1 lowers.

Hence, in this embodiment, an area on the gas outlet 4 side of a lower part of the interior of the container body 2 is formed as the second chamber 7 where little oil accumulates. This increases the distance between the gas outlet 4 and the oil level of the first chamber 6. Consequently, it is possible to prevent the generated oil droplets and oil bubbles from being sucked into the gas outlet 4. Some of the generated oil droplets and oil bubbles are carried on the flow of the compressed gas and are scattered from the oil level. At this time, the compressed gas passes through an upper part of the second chamber 7, turns along the inner surface of the second end wall 2c of the container body 2, and flows in the second chamber 7 toward the partition board 5. Since the oil droplets and oil bubbles have large inertial force, the oil droplets and oil bubbles move straight toward the partition board 5. Therefore, it is possible to cause the oil droplets and oil bubbles to collide with the partition board 5. Consequently, it is possible to separate the oil droplets and oil bubbles from the compressed gas and trap the oil droplets and oil bubbles carried on the flow of the compressed gas. This can prevent the generated oil droplets and oil bubbles from being carried on the flow of the compressed gas and flowing out through the gas outlet 4. Consequently, it is possible to improve the oil separation efficiency without increasing the manufacturing cost.

A demister (trapping means) 8 configured to trap the oil bubbles is provided at a lower part of the second chamber 7. Most of the oil bubbles generated at the oil level of the first chamber 6 cannot climb over the height of the partition board 5 and disappear after lapse of a certain period of time. However, some of the oil bubbles may possibly pass through an upper end of the partition board 5 when the oil increases in volume, and flow into the second chamber 7. Oil bubbles, which have climbed over the partition board 5, may possibly be carried on the flow of the compressed gas and flow out through the gas outlet 4. Hence, the demister 8 is provided at the lower part of the second chamber 7. Since the oil bubbles, which have passed through the partition board 5, are trapped by the demister 8, it is possible to prevent re-scattering of the oil bubbles.

A bottom part of the second chamber 7 is connected with a pipe line 10. Moreover, a float valve 9 configured to open and close the pipe line 10 is provided at the bottom part of the second chamber 7. The float valve 9 is constructed to open the pipe line 10 when a certain amount of oil accumulates on the bottom part of the second chamber 7, so that the oil flows out of the container body 2 through the pipe line 10. The oil, which has passed through the float valve 9 and flown out, flows through the pipe line 10 and joins the oil circulation path 28.

The oil droplets and oil bubbles trapped by the partition board 5 and the demister 8 accumulate on the bottom part of the second chamber 7. Since the amount of the oil droplets and oil bubbles increases with lapse of time, the oil droplets and oil bubbles are carried again on the flow of the compressed gas and flow out through the gas outlet 4 when a certain amount of the oil droplets and oil bubbles accumulates. Moreover, the oil droplets and oil bubbles may possibly flow out through the gas outlet 4 when the oil level of the oil, which has accumulated on the bottom part of the second chamber 7, reaches the gas outlet 4. Hence, the float valve 9 provided at the bottom part of the second chamber 7 is constructed to cause the oil to flow out of the container body 2 when a certain amount or more of the oil accumulates on the bottom part of the second chamber 7. This can prevent the oil, which has accumulated on the bottom part of the second chamber 7, from flowing out through the gas outlet 4.

The elbow inflow pipe 11 is provided in the container body 2. The elbow inflow pipe 11 is an inflow pipe, through which the compressed gas that contains the oil and has flown through the discharge flow path 24 flows into the container body 2. The elbow inflow pipe 11 is fixed to the container body 2 so that the compressed gas containing the oil flows into the container body 2 along a direction which does not face the oil level of the first chamber 6. As described above, the gas inlet 3 is an opening on the downstream side of the elbow inflow pipe 11. Regarding the elbow inflow pipe 11 in this embodiment, a gas inflow end is fixed to the drum part 2a, and a middle part is bent. Although the elbow inflow pipe 11 jets the compressed gas containing the oil toward the first end wall 2b of the container body 2, the inflow direction of the gas is not limited to this. That is, the inflow direction of the compressed gas, i.e., a direction in which the gas inlet 3 opens, may be any direction other than a direction which faces the oil level of the oil that have accumulated in the first chamber 6, and may be a direction parallel to the oil level (i.e., horizontal direction), for example. Moreover, the present invention is not limited to a structure in which a bent elbow inflow pipe 11 is provided as an inflow pipe, as long as a structure is provided in which the compressed gas is caused to flow in along a direction other than the direction which faces the oil level.

In a case where the compressed gas introduced into the container body 2 is sprayed directly to the liquid level of the first chamber 6, the oil level of the first chamber 6 billows greatly, and the generation amount of oil droplets and oil bubbles increases. This lowers the oil separation efficiency of the oil separate and collect device 1. Hence, the elbow inflow pipe 11 prevents the compressed gas from being sprayed directly to the oil level of the first chamber 6, so that it becomes possible to suppress billowing of the oil level of the first chamber 6 and reduce the generation amount of the oil droplets and oil bubbles.

The elbow outflow pipe 12 is provided in the container body 2. The compressed gas in the container body 2 flows out of the container body 2 from the second end wall 2c side on the gas outlet 4 side (the other end side) through the elbow outflow pipe 12. The elbow outflow pipe 12 has: a first section which penetrates the drum part 2a of the container body 2; and a second section which is bent from the first section toward the second end wall 2c. The gas outlet 4 is an opening on the upstream side of the second section of the elbow outflow pipe 12. Since the elbow outflow pipe 12 is formed in a bent shape, the gas outlet 4 is disposed at a position far from the partition board 5. It is to be noted that an outflow pipe having a straight shape may be provided instead of the elbow outflow pipe 12 having a bent shape.

In a case where the gas outlet 4 is positioned close to the oil level of the first chamber 6, the oil droplets and oil bubbles may possibly be carried on the flow of the compressed gas and flow out through the gas outlet 4. Hence, the elbow outflow pipe 12 is provided so as to keep the entrance of the gas outlet 4 far from the oil level of the first chamber 6, so that it becomes possible to reduce the scattering amount of the oil droplets and oil bubbles, which are carried on the flow of the compressed gas and flow out.

Figure 2:
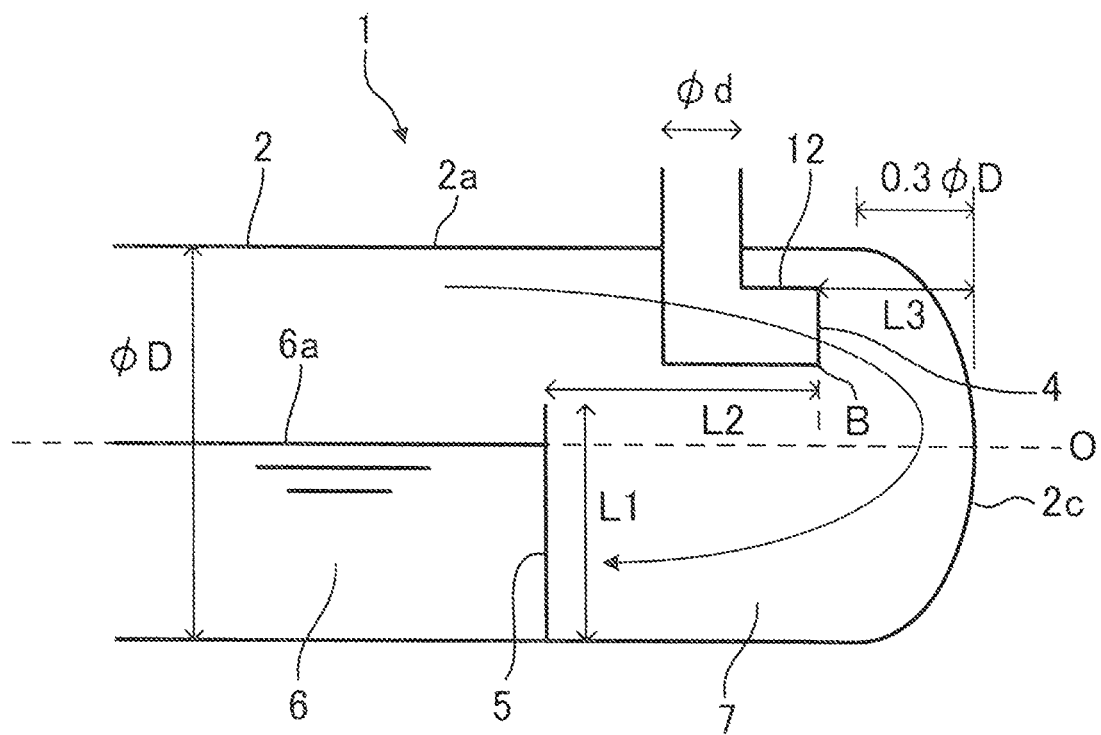
FIG. 2 is an enlarged view of a principal part A of FIG. 1.

As illustrated in FIG. 2 which is an enlarged view of a principal part A of FIG. 1, the height of an oil level 6a of the first chamber 6 is set equal to or smaller than 0.5 φD, assuming that the drum diameter of the container body 2 (the inner diameter of the drum part 2a) is φD (mm). In addition, the height L1 (mm) of the partition board 5 from a lower end of the inner surface of the drum part 2a is larger than 0.5 φD. Moreover, the second end wall 2c on the gas outlet 4 side of the container body 2 is curved to have a depth of 0.3 φD. In other words, the distance from a connection section of the drum part 2a and the second end wall 2c to the most protruded end of the second end wall 2c in a central axis O direction (cylinder axis direction) of the drum part 2a is set to 0.3 φD. An end wall on the gas inlet 3 side (first end wall 2b) of the container body 2 is also set to have a similar shape. It is to be noted that the first end wall 2b and the second end wall 2c of the container body 2 are not limited to a curved shape but may each have a flat shape.

Assume that the position of a part B, which is closest to the first chamber 6, of an inner edge of an opening edge of an opening (gas outlet 4) of the elbow outflow pipe 12 in the central axis O direction of the container body 2 is used as the origin, and the gas inlet 3 side is positive. That is, assume that the position of a lower end part of the central axis direction end part of the inner edge of the opening (gas outlet 4) of the elbow outflow pipe 12 is used as the origin, and a direction from the origin toward the gas inlet 3 in the cylinder axis direction of the drum part 2a is positive. In such a case, the partition board 5 is disposed at a position between 0 (mm) and 0.5 φD (mm) inclusive with respect to the origin. That is, the distance L2 (mm) between the origin and a surface on the first chamber 6 side of the partition board 5 is set between 0 (mm) and 0.5 φD (mm) inclusive.

In a case where the distance L2 is smaller than 0 mm, the oil level of the first chamber 6 reaches a lower part of the gas outlet 4 as will be described later. Therefore, the distance between the gas outlet 4 and the oil level decreases, and the oil, which is carried on the flow of the compressed gas and is scattered, increases. Moreover, in a case where the distance L2 exceeds 0.5 φD, the distance between the gas outlet 4 and the oil level becomes too large. Therefore, compressed gas collides with the partition board 5 on the further upstream side, the turbulence of the compressed gas becomes large, and the oil scattered from the oil level into the compressed gas increases. Hence, the distance L2 is set between 0 (mm) and 0.5 φD (mm) inclusive, so that it becomes possible to form the flow of the compressed gas, with which the oil droplets and oil bubbles hardly flow out through the gas outlet 4, around the gas outlet 4. This can further improve the oil trapping performance.

The height L1 (mm) of the partition board 5 is larger than the height of the oil level 6a of the first chamber 6 and equal to or smaller than 0.8 φD (mm). In a case where the partition board 5 is too high, the compressed gas (the compressed gas around the oil level where the oil is mainly scattered) passes through the vicinity closer to the gas outlet 4, and therefore the oil scattered from the gas outlet 4 increases as will be described later. Hence, the height L1 of the partition board 5 is set equal to or smaller than 0.8 φD (mm). This can suitably suppress the oil droplets and oil bubbles from being carried on the flow of the compressed gas around the gas outlet 4 and flowing out through the gas outlet 4. Moreover, since the compressed gas can be suitably turned along the inner surface of the container body 2 as illustrated by the arrow in FIG. 2, it is possible to cause the oil droplets and oil bubbles, which are moved straight by the action of inertial force, to collide with the partition board 5 from the second chamber 7 side. This can suitably trap the oil droplets and oil bubbles.

In the central axis O direction of the container body 2, the part B, which is closest to the first chamber 6, of the inner edge of the opening edge of the gas outlet 4 is disposed at a position 0.7 φD (mm) or more away from a side wall (second end wall 2c) on the gas outlet 4 side of the container body 2. That is, in the cylinder axis direction of the drum part 2a, the distance L3 (mm) between the part B, which is closest to the first chamber 6, of the inner edge of the opening edge of the gas outlet 4 and the side wall (second end wall 2c) on the gas outlet 4 side of the container body 2 is set equal to or larger than 0.7 φD (mm). Here, the part B, which is closest to the first chamber 6, of the inner edge of the opening edge of the gas outlet 4 is the lowest part of the central axis direction end part of the inner edge of the gas outlet 4. This causes compressed gas to flow through an upper part of the second chamber 7, descend along the inner surface of the second end wall 2c of the container body 2, and suitably form turning flow toward the partition board 5 as illustrated by the arrow in FIG. 2. Accordingly, it is possible to cause the oil droplets and oil bubbles, which are moved straight by the action of inertial force, to collide with the partition board 5 and suitably trap the oil droplets and oil bubbles, and it is therefore possible to further improve the oil separation performance.

(Evaluation of Oil Trapping Performance)

Now, the result of evaluation of the oil trapping performance by simulation regarding different conditions of the partition board 5 will be explained. Specifically, the oil trapping performance was evaluated by setting the thickness of the partition board 5 to 6 mm and varying the height L1 (mm) of the partition board 5 and the distance L2 (mm) in FIG. 2. Moreover, evaluation was also made regarding different conditions of the distance 1L3 (mm) or a condition without the partition board 5. Table 1 shows fifteen types of conditions for which evaluation was made.

TABLE 1

| | L1 | L2 | L3 |
|---|---|---|---|
| | | | UNIT: mm |
| case 0 | WITHOUT PARTITION BOARD | | |
| case 1 | 0.6 φD | −1.2 φD | φD |
| case 2 | 0.6 φD | −0.6 φD | φD |
| case 3 | 0.6 φD | −0.1 φD | φD |
| case 4 | 0.6 φD | 0 | φD |
| case 5 | 0.6 φD | 0.3 φD | φD |
| case 6 | 0.6 φD | 0.8 φD | φD |
| case 7 | 0.8 φD | −1.2 φD | φD |
| case 8 | 0.8 φD | −0.6 φD | φD |
| case 9 | 0.8 φD | −0.1 φD | φD |
| case 10 | 0.8 φD | 0 | φD |
| case 11 | 0.8 φD | 0.3 φD | φD |
| case 12 | 0.8 φD | 0.8 φD | φD |
| case 13 | 0.6 φD | 0.5 φd | 0.5 φD |
| case 14 | 0.6 φD | 0.5 φd | 0.7 φD |
| case 15 | 0.6 φD | 0.5 φd | 1.3 φD |

Here, the inner diameter φD of the drum part 2a of the container body 2 was set to 254 mm, the length in the horizontal direction of the first chamber 6 was set to 2,000 mm, and the inner diameter φd of the gas inlet 3 and the gas outlet 4 was set to 60 mm. Moreover, the height of the oil level of the first chamber 6 was set to 0.5 φD. This is because the height of the oil level of the first chamber 6 is generally designed to be 0.5 φD from the trade-off relation between the retention time of lubricating oil and the size of the container body 2. In addition, air having a temperature of 50° C., a pressure of 2.0 MPaG, and a mean velocity of 0.48 m/s in the container body 2 was made to flow as compressed gas.

A method of arranging droplets each having a diameter of 10 μm at regular intervals on the oil level of the first chamber 6 and comparing possibilities (discharge rates) of flowing out through the gas outlet 4 of these oil droplets regarding the above fifteen conditions was performed as an evaluation method of the oil trapping performance. The result thereof is shown in FIGS. 3 and 4. FIG. 3 is a view illustrating the relation of the height L1 and the distance L2 to the discharge rate. FIG. 4 is a view illustrating the relation between the distance L3 and the discharge rate.

As illustrated in FIGS. 3 and 4, it is clear that the discharge rate of the oil droplets, i.e., the oil scattering amount, was reduced to approximately ½ in all conditions (cases 1 to 15) in which the partition board 5 was used. Moreover, it is clear that the discharge rate was further reduced when the height L1 of the partition board 5 was set within the range of 0.6 φD≤L1≤0.8 φD, the distance L2 between the origin and the partition board 5 was set within the range of 0≤L2≤0.5 φD, and the distance L3 between the part B, which is closest to the first chamber 6, of the inner edge of the opening edge of the gas outlet 4 and the side wall on the gas outlet 4 side of the container body 2 was set within the range of L3≥0.7 φD.

It is to be noted that the lower limit of the height L1 of the partition board 5 from the lower end part of the inner surface of the drum part 2a may be a height, with which the oil cannot climb over the partition board 5. Since the reduction efficiency of the discharge rate of a case where the height L1 of the partition board 5 is 0.6 φD is higher than that of a case where the height L1 is 0.8 φD as is clear from FIG. 3, it is thought that a reduction effect of the discharge rate can be also obtained from the perspective of extrapolation even when the height L1 is within the range of L1=0.5 φD to 0.6 φD.

It is thought that the effect becomes small in a case where the height L1 of the partition board 5 exceeds 0.8 φD because the compressed gas (the compressed gas around the oil level where the oil is mainly scattered) passes through the vicinity closer to the gas outlet 4 when the partition board 5 is too high. This is thought to increase oil scattered from the gas outlet 4. It is also thought that the effect of a case where the height L of the partition board 5 is 0.6 φD is larger than that of a case where the height L is 0.8 φD for a similar reason.

It is thought that the effect becomes small in a case where the distance L2 between the origin and the partition board 5 is smaller than 0 because the oil level of the first chamber 6 reaches a part below the gas outlet 4 in a case where the distance L2 is smaller than 0. In such a case, it is thought that the distance between the gas outlet 4 and the oil level becomes small, and the oil, which is carried on the flow of the compressed gas and is scattered, increases. Moreover, it is thought that the effect becomes small in a case where the distance L2 exceeds 0.5 φD because the distance between the gas outlet 4 and the oil level becomes too large in a case where the distance L2 exceeds 0.5 φD. In such a case, it is thought that the compressed gas collides with the partition board 5 on a further upstream side, and therefore the turbulence of the compressed gas becomes large, and the oil, which is scattered from the oil level into the compressed gas, increases.

Although pressure conditions of the compressed gas are set only to 2.0 MPaG in this evaluation, it is to be noted that an effect by the partition board 5 can be obtained under any pressure condition, since the relation between the position of the partition board 5 and the discharge rate does not vary even in different pressure conditions.

(Effect)

As described above, in the oil separate and collect device 1 according to this embodiment, the partition board 5 divides the lower part of a space in the container body 2 into the first chamber 6 on the gas inlet 3 side and the second chamber 7 on the gas outlet 4 side. This causes the oil separated from the compressed gas to accumulate mainly in the first chamber 6, and little oil accumulates in the second chamber 7. Here, if the compressed gas which has flown into the container body 2 is sprayed to the first chamber 6, the oil level of the oil, which has accumulated in the first chamber 6, bubbles, oil droplets are generated from the oil level, and bubbles including the oil are generated at the oil level. Moreover, in the horizontally elongated container body 2, the height position of the oil level of the first chamber 6 and the height position of the gas outlet 4 are close to each other. Therefore, the generated oil droplets and oil bubbles are carried on the flow of the compressed gas around the gas outlet 4 and flow out through the gas outlet 4. This lowers the oil separation efficiency of the oil separate and collect device 1. On the contrary, in a case such as this embodiment where an area on the gas outlet 4 side of the lower part of the interior of the container body 2 is constructed as the second chamber 7 where little oil accumulates, the distance between the oil level of the first chamber 6 and the gas outlet 4 becomes large. It is therefore possible to prevent the generated oil droplets and oil bubbles from being sucked into the gas outlet 4. Some of the generated oil droplets or oil bubbles are carried on the flow of the compressed gas and are scattered from the oil level. On the other hand, a part of the compressed gas passes through an upper part of the second chamber 7, turns along an inner surface of a side wall of the container body 2, and flows in the second chamber 7 toward the partition board 5. At this time, oil droplets and oil bubbles having large inertial force move straight toward the partition board 5. Therefore, the oil droplets and oil bubbles collide with the partition board 5 and are separated from the compressed gas. This makes it possible to trap oil droplets and oil bubbles carried on the flow of the compressed gas. In addition, it is possible to prevent the generated oil droplets and oil bubbles from being carried on the flow of the compressed gas and flowing out through the gas outlet 4, and it is therefore possible to improve the oil separation efficiency without increasing the manufacturing cost.

Moreover, in this embodiment, the distance L2 between the origin (the position of the part B in FIG. 2) and the partition board 5 is set between 0 (mm) and 0.5 $\phi$D (mm) inclusive. In a case where the distance L2 is smaller than 0 mm, the oil level of the first chamber 6 reaches a part below the gas outlet 4, and therefore the distance between the gas outlet 4 and the oil level becomes small. Therefore, the oil, which is carried on the flow of the compressed gas and is scattered, increases. On the other hand, in a case where the distance L2 exceeds 0.5 $\phi$D, the distance between the gas outlet 4 and the oil level becomes too large, and the compressed gas collides with the partition board 5 on a further upstream side. Therefore, the turbulence of the compressed gas becomes large, and the oil scattered from the oil level into the compressed gas increases. Hence, the distance L2 is set between 0 (mm) and 0.5 $\phi$D (mm) inclusive, so that flow of compressed gas, with which the oil droplets and oil bubbles hardly flow out through the gas outlet 4, can be formed around the gas outlet 4. This can further improve the oil trapping performance.

Moreover, in this embodiment, the height of the partition board 5 is set larger than the height of the oil level 6a of the oil, which has accumulated in the first chamber 6, and equal to or smaller than 0.8 $\phi$D (mm). In a case where the height of the partition board 5 is too large, the compressed gas (the compressed gas around the oil level where the oil is mainly scattered) passes through the vicinity closer to the gas outlet 4. Therefore, the oil scattered from the gas outlet 4 increases. Hence, the height L1 of the partition board 5 is set equal to or smaller than 0.8 $\phi$D (mm), so that it becomes possible to suitably suppress the oil droplets and oil bubbles from being carried on the flow of the compressed gas around the gas outlet 4 and flowing out through the gas outlet 4. Moreover, the compressed gas can be suitably turned along the side wall of the container body 2 as illustrated by the arrow in FIG. 2. It is therefore possible to cause the oil droplets and oil bubbles, which are moved straight by the action of inertial force, to collide with the partition board 5 and suitably trap the oil droplets and oil bubbles.

Moreover, in this embodiment, the distance L3 between the part B, which is closest to the first chamber 6, of the inner edge of the opening edge of the gas outlet 4 and the side wall (second end wall 2c) on the gas outlet 4 side of the container body 2 in the central axis O direction of the container body 2 is set equal to or larger than 0.7 $\phi$D (mm). This causes the compressed gas to suitably form turning flow, which flows through the upper part of the second chamber 7, descends along the side wall of the container body 2 and goes toward the partition board 5, as illustrated by the arrow in FIG. 2. Accordingly, it is possible to cause the oil droplets and oil bubbles, which are moved straight by the action of inertial force, to collide with the partition board 5 and suitably trap the oil droplets and oil bubbles. Consequently, it is possible to further improve the oil separation performance.

Moreover, in this embodiment, the demister 8 configured to trap oil bubbles is provided at a lower part of the second chamber 7. Most of the oil bubbles generated at the oil level of the first chamber 6 cannot climb over the height of the partition board 5, and disappear after lapse of a certain period of time. However, some of the oil bubbles may possibly pass through a part above the partition board 5 when the oil increases in volume, and flow into the second chamber 7. In addition, oil bubbles, which have passed through the partition board 5, may possibly be carried on the flow of the compressed gas and flow out through the gas outlet 4. Hence, the demister 8 is provided at the lower part of the second chamber 7, so that it becomes possible to trap the oil bubbles, which have passed through the partition board 5, and prevent re-scattering of the oil bubbles.

Moreover, in this embodiment, the float valve 9 is provided at the bottom part of the second chamber 7. The oil droplets and oil bubbles trapped by the partition board 5 and the demister 8 accumulate on the bottom part of the second chamber 7. Since the amount of the oil droplets and oil bubbles increases with lapse of time, the oil droplets and oil bubbles are carried again on the flow of the compressed gas and flow out through the gas outlet 4 when a certain amount of the oil droplets and oil bubbles accumulates. Moreover, the oil droplets and oil bubbles may possibly flow out through the gas outlet 4 when the oil level of the oil, which has accumulated on the bottom part of the second chamber 7, reaches the gas outlet 4. Hence, the float valve 9 is provided at the bottom part of the second chamber 7. This can cause the oil, which has accumulated on the bottom part of the second chamber 7, to flow out of the container body 2 and prevent the oil, which has accumulated on the bottom part of the second chamber 7, from flowing out through the gas outlet 4.

Moreover, in this embodiment, the elbow inflow pipe 11 is provided in the container body 2. The elbow inflow pipe 11 causes the compressed gas containing the oil to flow into the container body 2 along a direction which does not face the liquid level of the first chamber 6. In a case where the compressed gas is sprayed directly to the oil in the first chamber 6, the oil level of the first chamber 6 billows greatly, and the generation amount of the oil droplets and oil bubbles increases. This lowers the oil separation efficiency of the oil separate and collect device 1. Hence, the elbow inflow pipe 11 is constructed to prevent the compressed gas from being sprayed directly to the oil in the first chamber 6, so that it becomes possible to suppress the oil level of the first chamber 6 from billowing and reduce the generation amount of the oil droplets and oil bubbles.

Moreover, in this embodiment, the elbow outflow pipe 12 is provided in the container body 2. The elbow outflow pipe 12 causes the compressed gas in the container body 2 to flow out of the container body 2 from the side wall on the gas outlet 4 side. In a case where the gas outlet 4 is positioned close to the oil level of the first chamber 6, the oil droplets and oil bubbles may possibly be carried on the flow of the compressed gas and flow out through the gas outlet 4. Hence, the entrance of the gas outlet 4 is kept far from the oil level of the first chamber 6 by the elbow outflow pipe 12, so that it becomes possible to reduce the scattering amount of the oil droplets and oil bubbles, which are carried on the flow of the compressed gas and flow out.

Although the above description has explained the embodiment of the present invention, the above description merely illustrates a specific example and does not especially limit the present invention, and a specific structure or the like can be appropriately designed and modified. Moreover, the actions and effects described regarding the embodiment of the invention are merely a list of the most suitable actions and effects obtained from the present invention, and actions and effects by the present invention are not limited to what have been described regarding the embodiment of the present invention.

Here, the above embodiment will be summarized.

(1) An oil separate and collect device comprises: a horizontally elongated container body disposed in a horizontal orientation; a gas inlet which is located at an upper part on one end side of an interior of the container body and through which the compressed gas containing the oil flows into the container body; a gas outlet which is located at an upper part on the other end side of the interior of the container body and through which the compressed gas from which the oil has been separated flows out of the container body; and a partition board configured to divide a lower part of the interior of the container body into a first chamber on a gas inlet side and a second chamber on a gas outlet side.

(2) The container body may be a cylindrical body with both ends being closed. In such a case, the partition board may be disposed at a position between 0 (mm) and 0.5 $\phi D$ (mm) inclusive with respect to an origin, assuming that a drum diameter of the container body is $\phi D$ (mm), a position of a section, which is closest to the first chamber, of an inner edge of an opening edge of the gas outlet in a central axis direction of the container body is the origin, and the gas inlet side is positive.

(3) The container body may be a cylindrical body with both ends being closed. In such a case, a height of the partition board may be larger than a height of an oil level of the oil, which has accumulated in the first chamber, and equal to or smaller than 0.8 $\phi D$ (mm), assuming that a drum diameter of the container body is $\phi D$ (mm).

(4) The container body may be a cylindrical body with both ends being closed. In such a case, a section, which is closest to the first chamber, of an inner edge of an opening edge of the gas outlet in a central axis direction of the container body may be disposed at a position 0.7 $\phi D$ (mm) or more away from a side wall on a gas outlet side of the container body, assuming that a drum diameter of the container body is $\phi D$ (mm).

(5) In the oil separate and collect device, trapping means configured to trap a bubble of the oil may be provided at a lower part of the second chamber.

(6) In the oil separate and collect device, a float valve may be provided at a bottom part of the second chamber.

(7) In the oil separate and collect device, an elbow inflow pipe, through which the compressed gas containing the oil flows into the container body along a direction that does not face the first chamber, may be provided in the container body. In such a case, the gas inlet may be an opening on a downstream side of the elbow inflow pipe.

(8) In the oil separate and collect device, an elbow outflow pipe, through which the compressed gas in the container body flows out of the container body from a side wall side on the gas outlet side, may be provided in the container body. In such a case, the gas outlet may be an opening on an upstream side of the elbow outflow pipe.

In the above embodiment, the partition board divides the lower part of the space in the container body into the first chamber on the gas inlet side and the second chamber on the gas outlet side. This causes the oil, which has been separated from compressed gas, to accumulate mainly in the first chamber, and little oil accumulates in the second chamber. Here, if the compressed gas which has flown into the container body is sprayed to the first chamber, the oil level of the oil, which has accumulated in the first chamber, bubbles, oil droplets are generated from the oil level, and bubbles including the oil are generated at the oil level. Moreover, in the horizontally elongated container body, the height position of the oil level of the first chamber and the height position of the gas outlet are close to each other. Therefore, the generated oil droplets and oil bubbles are carried on the flow of the compressed gas around the gas outlet and flow out through the gas outlet. This lowers the oil separation efficiency of the oil separate and collect device. On the contrary, in a case where an area on the gas outlet side of a lower part of the interior of the container body is constructed as the second chamber where little oil accumulates as in this embodiment, the distance between the oil level of the first chamber and the gas outlet becomes large. It is therefore possible to prevent the generated oil droplets and oil bubbles from being sucked into the gas outlet. Some of the generated oil droplets or oil bubbles are carried on the flow of the compressed gas and are scattered from the oil level. On the other hand, a part of the compressed gas passes through the upper part of the second chamber, turns along the inner surface of the side wall of the container body, and flows in the second chamber toward the partition board. At this time, the oil droplets and oil bubbles having large inertial force move straight toward the partition board. Therefore, the oil droplets and oil bubbles collide with the partition board and are separated from the compressed gas. This makes it possible to trap the oil droplets and oil bubbles carried on the flow of the compressed gas. In addition, it is possible to prevent the generated oil droplets and oil bubbles from being carried on the flow of the compressed gas and flowing out through the gas outlet, and it is therefore possible to improve the oil separation efficiency without increasing the manufacturing cost.

The invention claimed is:

1. An oil separate and collect device for separating and collecting oil from compressed gas, which contains the oil and has been discharged from an oil-cooled compressor, the oil separate and collect device comprising:
   a horizontally elongated container body disposed in a horizontal orientation;
   a gas inlet which enters the container body at an uppermost part on one end side of an interior of the container body and through which the compressed gas containing the oil flows into the container body;

a gas outlet which enters the container body at an uppermost part on the other end side of the interior of the container body and through which the compressed gas from which the oil has been separated flows out of the container body; and a partition board configured to divide a lower part of the interior of the container body into a first chamber on a gas inlet side and a second chamber on a gas outlet side.

2. The oil separate and collect device according to claim 1, wherein trapping unit configured to trap a bubble of the oil is provided at a lower part of the second chamber.

3. The oil separate and collect device according to claim 1, wherein a float valve is provided at a bottom part of the second chamber.

4. The oil separate and collect device according to claim 1, wherein an elbow inflow pipe, through which the compressed gas containing the oil flows into the container body along a direction that does not face the first chamber, is provided in the container body, and the gas inlet is an opening on a downstream side of the elbow inflow pipe.

5. The oil separate and collect device according to claim 1, wherein an elbow outflow pipe, through which the compressed gas in the container body flows out of the container body from a side wall side on the gas outlet side, is provided in the container body, and the gas outlet is an opening on an upstream side of the elbow outflow pipe.

6. An oil separate and collect device for separating and collecting oil from compressed gas, which contains the oil and has been discharged from an oil-cooled compressor, the oil separate and collect device comprising:

a horizontally elongated container body disposed in a horizontal orientation;

a gas inlet which is located at an upper part on one end side of an interior of the container body and through which the compressed gas containing the oil flows into the container body;

a gas outlet which is located at an upper part on the other end side of the interior of the container body and through which the compressed gas from which the oil has been separated flows out of the container body; and a partition board configured to divide a lower part of the interior of the container body into a first chamber on a gas inlet side and a second chamber on a gas outlet side, wherein the container body is a cylindrical body with both ends being closed, and the partition board is disposed at a position between 0 (mm) and 0.5 $\phi D$ (mm) inclusive with respect to an origin, assuming that a drum diameter of the container body is $\phi D$ (mm), a position of a section, which is closest to the first chamber, of an inner edge of an opening edge of the gas outlet in a central axis direction of the container body is the origin, and the gas inlet side being located in a positive direction with respect to the origin.

7. An oil separate and collect device for separating and collecting oil from compressed gas, which contains the oil and has been discharged from an oil-cooled compressor, the oil separate and collect device comprising:

a horizontally elongated container body disposed in a horizontal orientation;

a gas inlet which is located at an upper part on one end side of an interior of the container body and through which the compressed gas containing the oil flows into the container body;

a gas outlet which is located at an upper part on the other end side of the interior of the container body and through which the compressed gas from which the oil has been separated flows out of the container body; and a partition board configured to divide a lower part of the interior of the container body into a first chamber on a gas inlet side and a second chamber on a gas outlet side, wherein the container body is a cylindrical body with both ends being closed, and a height of the partition board is larger than a height of an oil level of the oil, which has accumulated in the first chamber, and equal to or smaller than 0.8 $\phi D$ (mm), assuming that a drum diameter of the container body is $\phi D$ (mm).

8. An oil separate and collect device for separating and collecting oil from compressed gas, which contains the oil and has been discharged from an oil-cooled compressor, the oil separate and collect device comprising:

a horizontally elongated container body disposed in a horizontal orientation;

a gas inlet which is located at an upper part on one end side of an interior of the container body and through which the compressed gas containing the oil flows into the container body;

a gas outlet which is located at an upper part on the other end side of the interior of the container body and through which the compressed gas from which the oil has been separated flows out of the container body; and a partition board configured to divide a lower part of the interior of the container body into a first chamber on a gas inlet side and a second chamber on a gas outlet side, wherein the container body is a cylindrical body with both ends being closed, and a section, which is closest to the first chamber, of an inner edge of an opening edge of the gas outlet in a central axis direction of the container body is disposed at a position 0.7 $\phi D$ (mm) or more away from a side wall on a gas outlet side of the container body, assuming that a drum diameter of the container body is $\phi D$ (mm).

\* \* \* \* \*